DEMODULATING SYSTEMS FOR COLOR TELEVISION

Original Filed May 18, 1953 3 Sheets-Sheet 1

ROBERT ADLER
JOHN L. RENNICK
*INVENTORS.*

BY Francis W. Crotty

THEIR ATTORNEY.

DEMODULATING SYSTEMS FOR COLOR TELEVISION

Original Filed May 18, 1953 3 Sheets-Sheet 2

ROBERT ADLER
JOHN L. RENNICK
INVENTORS.
BY Francis W. Crotty
THEIR ATTORNEY.

DEMODULATING SYSTEMS FOR COLOR TELEVISION

Original Filed May 18, 1953 3 Sheets-Sheet 3

ROBERT ADLER
JOHN L. RENNICK
*INVENTORS.*

BY Francis W. Crosby

THEIR ATTORNEY.

United States Patent Office

Re. 24,747
Reissued Dec. 15, 1959

24,747

DEMODULATING SYSTEMS FOR COLOR TELEVISION

Robert Adler, Northfield, and John L. Rennick, Elmwood Park, Ill., assignors to Zenith Radio Corporation, a corporation of Delaware

Original No. 2,779,818, dated January 29, 1957, Serial No. 505,476, May 2, 1955, which is a continuation of Serial No. 355,476, May 18, 1953. Application for reissue May 19, 1958, Serial No. 736,421

14 Claims. (Cl. 178—5.4)

Matter enclosed in heavy brackets [ ] appears in the original patent but forms no part of this reissue specification; matter printed in italics indicates the additions made by reissue.

This is a continuation of an application of Robert Adler and John L. Rennick, now abandoned, Serial No. 355,476, filed May 18, 1953, and assigned to the same assignee as the present application.

This invention pertains to a new and improved demodulating system and is particularly directed to a demodulating system adapted for use in a color television receiver. Although the invention is generally applicable to dot sequential or simultaneous color television systems, it is particularly valuable when employed in connection with a color television transmission of the general type currently proposed by the National Television System Committee and will be described in that environment.

In the color television system proposed by the National Television System Committee, commonly referred to as the NTSC system, the color and luminance information pertaining to a scanned image are segregated and transmitted as individual signals interleaved within a portion of the frequency spectrum. At the transmitter, three color image signals representative of a scanned image are combined in a fixed ratio to form a luminance or monochrome signal. At the same time, a plurality of color difference signals are developed, each individually corresponding to the amplitude difference between one of the color image signals and a predetermined portion of the brightness signal, that predetermined portion presently being established as the complete brightness signal. A system of this basic type is described in the copending application of John L. Rennick, Serial No. 215,761, filed March 15, 1951, and assigned to the same assignee as the present application. The color difference signals represent the hue and saturation values of the color components included in the image, whereas the luminance signal represents the light and shade values of the image. Although the ultimate transmission standards have not as yet been established, it is generally considered that the monochrome signal and the essential information representing only two of the color difference signals will be transmitted, since the third color difference signal may then be derived at the receiver, due to the fixed mathematical relationship existing between the monochrome signal and each of the color difference signals. The color difference signals employed to develop the transmitted composite color signal need not necessarily be referred to the primary colors employed in the original analysis of the image at the transmitter; in at least one proposed modification of the basic system the transmitted color information comprises color difference signals derived at the transmitter by additive combination of the original color difference signals and accordingly referred to different primary colors.

Certain standardized definitions have been developed for the NTSC system; a list of the approved definitions is included in the technical journal "Electrical Engineering" for December 1952, pages 1120–1121. Unless otherwise specified, the terms defined in that list, as employed throughout this specification and in the appended claims, conform to the standardized terminology. Some of the more frequently used terms are as follows:

Carrier color signal: The sidebands of the modulated color subcarrier (plus the color subcarrier, if not suppressed) which are added to the monochrome signal to convey color information.

Color burst or Color sync. signal: That portion of the composite color signal comprising the few sine-wave cycles of color subcarrier frequency (and the color burst pedestal, if present) which is added to the horizontal pedestal for synchronizing the color-carrier reference signal.

Color carrier reference signal or Color reference signal: A continuous signal having the same frequency as the color subcarrier and having fixed phase with respect to the color burst. This signal is used for the purposes of modulation at the transmitter and demodulation at the receiver.

Color difference signal: An electric signal which, when added to the monochrome signal, produces a signal representative of one of the tristimulus values (with respect to a stated set of primaries) of the transmitted color.

Composite color signal: The color picture information including blanking and all synchronizing signals.

Luminance signal or Monochrome signal: A signal wave which is intended to have exclusive control of luminance picture.

Matrix: An electrical network for additively combining a plurality of electrical signals. (This is a limited definition not conforming to the standardized NTSC terminology.)

In conventional color television receivers for use in the NTSC system, the carrier color signal is applied to two demodulators, wherein it is heterodyned with selected phase components of a locally generated color reference signal to develop the two color difference signals utilized at the transmitter in forming the carrier color signal. Usually, these two color difference signals correspond to the red and blue components of the image and are designated as R—Y and B—Y. Many different types of demodulators have been employed for this purpose. For effective reproduction of an image, it is also necessary to develop a third color difference signal, usually designated as G—Y and corresponding to the green components of the scanned image. In the conventional demodulating system, this signal is formed by inverting the red and blue color difference signals and additively combining them in a predetermined ratio to form the desired third color difference signal. A demodulating system of this type has several inherent disadvantages; for example, the amplification factors of the inverter stages employed must be precisely controlled so that the two inverted color difference signals are combined in the required fixed proportionality. In addition, the entire inverting and combining system must be matched with each of the other two color difference signal channels to provide for precise signal balance between these color difference signals as applied to the image reproducer. Otherwise, the reproduced image is overcolored or undercolored with respect to one or more of the primary colors and an unsatisfactory image results. These problems are accentuated if the above-mentioned modification of the transmission system is adopted and the color information is conveyed by color difference signals which are referred to a different set of primary colors from those employed at the image analyzing and synthesizing transducers; in this case, each of the color difference signals utilized in the receiver image reproducer is formed by additively combining the demodulated color difference signals and it is necessary that both of the latter signals be available in normal and inverted polarities.

It is an object of this invention, therefore, to provide a new and improved demodulating system for a color television receiver which permits direct combination of the output signals from the demodulators to form a third color difference signal without requiring phase inversion.

It is another object of the invention to provide a new and improved color demodulating system in which the matrix circuitry is of considerably reduced complexity.

It is a further object of the invention to provide a new and improved color demodulating system which inherently provides for a proper color balance in the reproduced image.

It is an additional object of the invention to provide a color demodulating system which permits direct utilization of the demodulated color difference signals by an image reproducer without requiring additional amplification.

It is a corollary object of the invention to provide a new and improved color demodulating system which is relatively simple and expedient to construct and economical to manufacture.

The demodulating system of the invention is adapted for use in a color television receiver including means responsive to a received color television signal for developing a carrier color signal and a color reference signal. In accordance with *a preferred embodiment of* the invention, a demodulating system comprises a first electron-discharge device including means comprising a cathode for projecting an electron stream, a pair of output electrodes, and a first control electrode system interposed between the cathode and output electrodes. A second control electrode system having a transconductance of one polarity with respect to one of the output electrodes and a transconductance of opposite polarity with respect to the other of the output electrodes is incorporated in the device. The demodulating system also comprises a second electron-discharge device including means comprising a cathode for projecting an electron stream, an output electrode, and first and second control electrode systems intermediate the cathode and the output electrode. Means are included in the system for concurrently impressing the carrier color signal on one of the control electrode systems of the first device and on one of the control electrode systems of the second device; further means are employed to concurrently impress the color reference signal in predetermined phase on the other control electrode system of the first device and in predetermined different phase on the other control electrode system of the second device. A first output circuit is coupled to one output electrode of the first device to develop a first color difference signal of predetermined polarity, and a second output circuit is coupled to the output electrode of the second device to develop a second color difference signal of the same polarity. In addition, a third output circuit is coupled to the other output electrode of the first electron-discharge device to develop an opposite-polarity first color difference signal.

*In its broader aspects, the demodulating system of the invention includes a first electron discharge device including a first electrode system, comprising a pair of output electrodes, for establishing a space discharge current and a second electrode system, comprising control electrode means, for controlling the space discharge. The demodulator system also comprises means, including the electrode systems, responsive concurrently to a predetermined phase of one of the developed signals and to the other of the signals for developing a first color difference signal of one polarity on an output electrode and of the opposite polarity on the remaining output electrode. A second electron discharge device includes similar electrode systems.*

*Means, including the second device electrode systems, responds concurrently to a predetermined different phase of the one developed signal and to the other developed signal for developing a second color difference signal of one polarity on an output electrode and of the opposite polarity on the other output electrode of the second device. Finally, the system includes means coupled to the remaining output electrode of each of the devices for developing a third color difference signal.*

The features of the present invention which are believed to be novel are set forth with particularity in the appended claims. The invention, together with further objects and advantages thereof, may best be understood, however, by reference to the following description taken in connection with the accompanying drawings in the several figures of which like reference numerals indicate like elements and in which:

Figure 1:
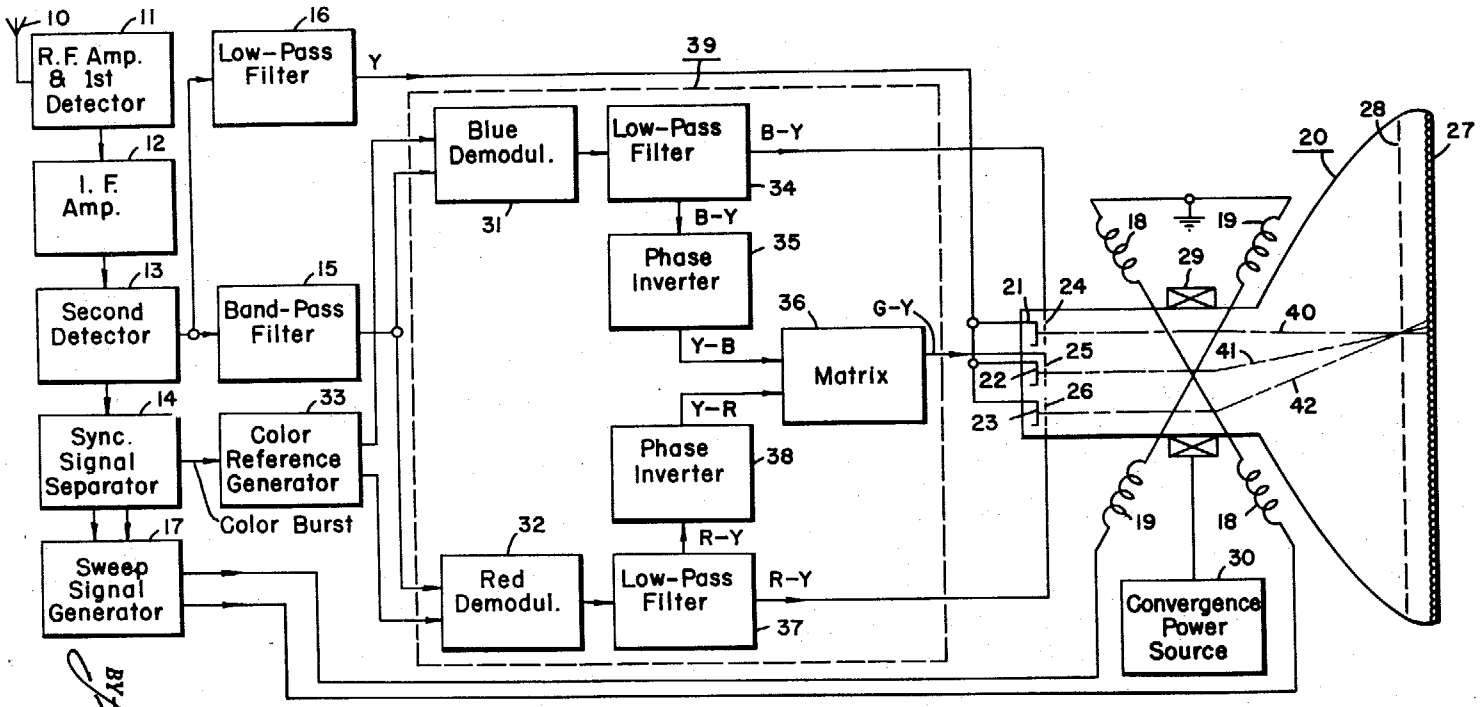
Figure 1 is a schematic diagram of a conventional color television reciver for use in the NTSC system.

The conventional color television receiver schematically illustrated in Figure 1 includes an antenna 10 coupled to a radio-frequency amplifier and first detector 11, which is connected to an intermediate-frequency amplifier 12. The output of intermediate-frequency amplifier 12 is coupled to a second detector 13. The output stage of second detector 13 is coupled to a synchronizing signal separator 14, a band-pass filter 15, and a low-pass filter 16. Synchronizing-signal separator 14 is coupled to a scanning signal generator 17 which, in turn, is connected to two sets of deflection coils 18 and 19 mounted in space quadrature relation on the neck of an image reproducer 20. Low-pass filter 16 is coupled to three cathodes 21, 22 and 23 of image reproducer 20. Three control electrodes 24, 25 and 26 are incorporated in reproducer 20 and are individually associated with cathodes 21, 22 and 23 respectively, each control electrode-cathode combination comprising a portion of an individual electron gun. Image reproducer 20 also includes a luminescent tricolor screen 27 and an apertured mask 28 interposed between screen 27 and the electron guns. A convergence system represented by coil 29 is interposed between mask 28 and control electrodes 24–26; convergence system 29 is energized from a convergene power source 30.

Band-pass filter 15 is coupled to two demodulators 31 and 32; a color reference generator 33, connected to the output of synchronizing-signal separator 14, is also coupled to the demodulators. Demodulator 31, here designated as the "blue" demodulator, is connected to a low-pass filter 34 which, in turn, is coupled to control electrode 24 of reproducer 20. In addition, the output of filter 34 is coupled to a phase inverter 35 which is connected to a matrix 36. Similarly "red" demodulator 32 is coupled through a low-pass filter 37 to control electrode 26 and to a phase inverter 38 which is also coupled to mixer 36. The output stage of mixer 36 is connected to control electrode 25. Demodulators 31 and 32, filters 34 and 37, inverters 35 and 38, and mixer 36 form the receiver demodulating system 39 enclosed in dash outline.

The general type of color television signal developed and transmitted in the NTSC system and the structure and operation of the typical color receiver illustrated in Figure 1 are generally well known in the art; accordingly, a detailed description of the operation of the receiver is deemed unnecessary. However, a more complete understanding of the invention to be described in connection with Figures 2–4 can best be attained by first briefly describing and analyzing the known system. It will be understood that the particular receiver construction shown is adapted for use in a system in which the transmitted color difference signals are referred to the same primary colors as are utilized in analyzing and reproducing the image; this type of system is chosen solely for purposes of simplification and clarification. The color picture signal received at antenna 10 of the receiver of Figure 1 is of the general form $$(1)\quad E=Y+K[(R-Y)\sin wt+(B-Y)\cos wt]$$

in which E is the color picture signal, Y is the luminance signal, (R—Y) and (B—Y) are color difference signals, w represents the angular frequency of the color carrier or color carrier reference signal, and K is a constant. The formation of this color picture signal is based on derivation at the transmitter of three color image signals usually corresponding to the additive primary colors red, blue and green and designated R, B and G. In forming the luminescent signal from these color image signals, a fixed proportionality is established; although no standard for an ultimate system has as yet been agreed upon, the following equation may be taken as generally representative:

$$(2)\quad Y=0.1B+0.3R+0.6G$$

This expression may be rewritten in the form:

$$(3)\quad .1(B-Y)+.3(R-Y)+.6(G-Y)=0$$

Equation 3 may in turn be transposed and rewritten as follows:

$$(4)\quad G-Y=-.167(B-Y)-.5(R-Y)=.167(Y-B)+.5(Y-R)$$

As indicated by Equation 4, the untransmitted color difference signal, G—Y, may be formed in the receiver by the additive combination of predetermined fractional portions of signals corresponding to the red and blue color difference signals but having opposite polarities.

When the receiver of Figure 1 is placed in operation, a received telecast of the general form indicated in Equation 1 and including synchronizing-signal components is intercepted by antenna 10 and detected and amplified in unit 11. The resulting intermediate-frequency signal is supplied to amplifier 12 and, after amplification, is applied to second detector 13. The composite color signal *or wave* detected in unit 13 is applied to synchronizing-signal separator 14, which separates the color sync signal or color burst components from the composite signal; the color sync signal is utilized in generator 33 to control the phase and frequency of a locally developed color carrier reference signal. The scanning-synchronizing components of the composite signal are segregated in circuit 14 and are employed in generator 17 to control suitable scanning signals applied to deflection coils 18 and 19. At the same time, the color picture signal developed in second detector 13 is applied to low-pass filter 16, which effectively translates only those portions of the color picture signal generally corresponding to luminance signal Y. Band-pass filter 15, on the other hand, effectively translates only those portions of the color picture signal containing chrominance information and generally corresponding to the second expression in Equation 1.

In blue demodulator 31, the carrier color signal supplied from filter 15 is heterodyned with the color reference signal from generator 33 to derive a signal which, after translation through filter 39, corresponds to the color difference signal B—Y. Similarly, the color reference signal is impressed in different phase upon demodulator 32 and is employed therein to demodulate the carrier color signal and develop the second color difference signal R—Y. As indicated by Equation 1, color difference signals R—Y and B—Y are modulated in quadrature phase relation upon the color subcarrier; consequently, in the usual system, color reference generator 33 includes a phase-shifting network comprising two output circuits which provide two output signals displaced from each other by a phase angle of ninety degrees to permit effective demodulation of both color difference signals. The first color difference signal, B—Y, is inverted in circuit 35 to develop a color difference signal corresponding to B—Y but of opposite polarity; this latter signal may be expressed as Y—B. Correspondingly, the output from inverter 38 may be expressed as Y—R. Selected fractional portions of the two opposite-polarity color difference signals Y—B and Y—R are additively combined in matrix 36 in accordance with Equation 4 to form the third color difference signal G—Y, which, it should be noted, has the same effective polarity as the two original color difference signals R—Y and B—Y.

In the electron gun comprising cathode 21 and control electrode 24, the luminance signal Y and the color difference signal B—Y are employed to control the intensity of an electron beam 40 which is projected toward screen 27. Similarly, two additional electron beams 41 and 42 are developed by the electron guns comprising cathode 22 and grid 25 and cathode 23 and grid 26. Beams 40—42 are deflected to converge at a common point approximately within the plane defined by mask 28, the deflection being effected by convergence system 29 and power source 30. Mask 28 serves to restrict the path of each of the beams so that it can impinge only upon those portions of screen 27 which have a predetermined color radiation characteristic; in other words, beam 40 excites only blue luminescent areas and beams 41 and 42 excite only the green and red luminescent areas respectively of target electrode 27. The beams are scanned across the face of screen 27 in the usual fashion in response to the scanning signals applied to coils 18 and 19. Many of the elements of the receiver of Figure 1 have been shown in greatly simplified form and others have been omitted entirely; this has been done solely for the purposes of simplification and clarification. It should be understood that the invention is not predicated on the use of any particular type of image reproducer or any specific type or arrangement of receiving circuits; rather, these elements may be replaced by any suitable components capable of performing the requisite functions.

The conventional receiver illustrated in Figure 1 presents several difficult demodulation system problems, particularly with respect to maintaining a proper relative amplitude between the color difference signals while at the same time maintaining the necessary predetermined relationship between the color difference signals and the luminance signal. Essentially, phase inverters 35 and 38 are non-linear devices, and tend to introduce variation in the relative signal levels of the color difference signals. In addition, they also make it more difficult to obtain the necessary fixed relationship between the fractional portions of Y—R and Y—B which are combined in matrix 36. These and other difficulties inherently present in the conventional color demodulating system are effectively minimized in the color demodulating system 39' shown in Figure 2 and constructed in accordance with the present invention.

Color demodulating system 39' includes a pair of electron-discharge devices 40 and 41. Device 40 comprises a cathode 42, a first control electrode system consisting of an intensity-control grid 43, an accelerating electrode 44, a second control electrode system comprising a pair of deflection-control electrodes 45, and a pair of output electrodes or anodes 46 and 47. Cathode 42 is connected to a plane of reference potential or ground through a pair of series-connected resistors 48 and 49, and an additional resistor 50 is coupled between control electrode 43 and the junction of resistors 48 and 49. Control electrode 43 is also coupled to a source of color carrier signal, such as band-pass filter 15 of Figure 1, through a coupling capacitor 51. Deflectors 45, to which may be applied suitable positive voltage bias or which may be operated at zero bias, depending on the tube construction, are connected to one of the output circuits of color reference generator 33 (Figure 1). Output electrode 46 is coupled to a source of positive operating potential B+ through an output circuit comprising a peaking coil 52 and a load resistor 53; the junction between resistor 53 and coil 52 is connected through a coupling capacitor 54 to control electrode 24 of image reproducer 20, of which only the three cathodes and associated control electrodes are shown in this figure. As in Figure 1, cathode 21 is associated with control electrode 24 and is coupled to a source of luminance signal such as low-pass filter 16 of Figure 1. A direct-current restoring device or D.C. inserter is coupled between cathode 21 and control electrode 24. The D.C. inserter comprises a diode 55 of which the cathode is connected to capacitor 54 and the anode is coupled to a source of unidirectional positive operating potential B+; a bias resistor 56 and a potentiometer 57 are included to permit adjustment of the operating potentials of image reproducer 20. A resistor 58 is coupled in parallel with diode 55, and the anode of diode 55 is coupled to cathode 21 through a capacitor 59. The D.C. inserter comprising diode 55 and circuit elements 56—59 is a familiar part of the television art and may be replaced by any suitable comparable structure.

Discharge device 41, which may be identical in construction to device 40, comprises a cathode 62, a first control electrode 63, an accelerating electrode 64, a pair of deflection-control electrodes 65, and a pair of anodes or output electrodes 66 and 67. Furthermore, most of the circuit connections to the electrodes of this device are the same as for demodulator tube 40. Cathode 62 is grounded through a pair of series-connected resistors 68 and 69 and a variable resistor 61, and a resistor 70 is coupled between control electrode 63 and the junction of resistors 68 and 69. Adjustable resistor 61 is interposed between resistor 69 and ground to provide a balancing gain adjustment. Control electrode 63 is also coupled to band-pass filter 15 of Figure 1 through a capacitor 71. Deflection-control electrodes 65 are suitably biased and connected to that output circuit of color reference generator 33 (Figure 1) which develops a signal displaced ninety degrees in phase from the signal applied to deflectors 45 of tube 40. One of the output electrodes, anode 66, is coupled to control electrode 26 of the image reproducer through a load circuit and D.C. inserter arrangement identical with that employed to coupled anode 46 of device 40 to control electrode 24. Thus, peaking coil 72, load resistor 73, coupling capacitor 74, diode 75, resistors 76 and 78, coupling capacitor 79 and potentiometer 77 are all coupled together in the same manner as their counterparts bearing corresponding reference numerals in the "50" series.

The second output electrode of discharge device 40, anode 47, is also coupled to potential source B+ through an output circuit comprising a resistor 80. In addition, anode 47 is coupled to source B+ through a series network comprising a resistor 81, a peaking coil 82, and a load resistor 83. Second anode 67 of device 41 is coupled to potential source B+ through an output circuit comprising a resistor 84 which is connected to the junction between resistor 81 and coil 82. Load resistor 83 is coupled to control electrode 25 of the image reproducer through a D.C. inserting circuit essentially identical with that coupling load resistor 53 to control electrode 24 and cathode 21. Thus, for load resistor 83, the direct-current restorer comprises a capacitor 85, a diode 86, a resistor 87 and a potentiometer 88 as well as a resistor 89 and a coupling capacitor 90. Cathodes 22 and 23, of course, are coupled to low-pass filter 16 (Figure 1) in the same manner as cathode 21. Accelerating electrode 44 of tube 40 is coupled to operating potential source B+ through two resistors 91 and 92, accelerating electrode 64 of device 41 being connected to the junction of the two resistors, and the two accelerating electrodes are preferably coupled to ground by separate bypass condensers.

When demodulating system 39′ is placed in operation, a stream of electrons is emitted from cathode 42 of electron-discharge device 40 and projected toward anodes 46 and 47. The intensity of *or the current in* this stream of electrons is controlled by the potential applied to control electrode 43. After the electron stream passes first control electrode system 43, it is accelerated by electrode 44 and passes between deflection-control electrodes 45. The operating potentials of the various electrodes are so adjusted that if no signal is applied to deflectors 45, the electron beam is equally divided between output electrodes 46 and 47. However, an electrical signal applied to the deflection-control electrodes causes the electron beam to impinge upon one or the other of the anodes and results in the translation through the output circuit coupled to that anode of a signal corresponding to the intensity variations of the electron stream. Preferably, the amplitude range of the color carrier signal is adjusted to fall within the linear portion of the dynamic control characteristic of electrode 43. Accordingly, the intensity of the electron stream within tube 40 is controlled or modulated in accordance with the carrier color signal impressed upon control electrode system 43 from band-pass filter 15. At the same time, the color reference signal is applied in predetermined phase to the deflection-control system and causes an additional modulation of the beam. The resulting signal appearing on the output circuit coupled to anode 46 corresponds to one of the color difference signals. For example, when the carrier color signal is applied in predetermined polarity to control electrode 43 and when a color reference signal of the form cos wt is applied, also in preselected polarity, between deflection plates 45, the signal appearing across load resistor 53 corresponds to the color difference signal B—Y, and has a predetermined polarity. This color difference signal is employed in conjunction with the luminance signal Y applied to cathode 21 to control the intensity of the electron beam generated by the gun comprising cathode 21 and control electrode 24 in conventional fashion. The direct-current level of the applied signals is controlled by the D.C. restorer.

Similarly, when the carrier color signal is applied to control electrode 63, and a signal corresponding to sin wt is applied to deflection-control electrodes 65, the signal appearing across load resistor 73 represents color difference signal R—Y and has the same polarity as the color difference signal B—Y appearing across resistor 53. Color difference signal R—Y and luminance signal Y are applied to control electrode 26 and cathode 23 respectively to control the intensity of the second electron beam developed in image reproducer 20 (Figure 1), and the direct-current level is controlled by the D.C. inserter comprising diode 75.

With beam switching under deflection control, each increase in beam current to one output electrode is accompanied by a corresponding decrease in beam current to the other output electrode. In other words, control electrode system 45 has a transconductance of one polarity with respect to anode 46 and a transconductance of the opposite polarity with respect to anode 47. As described above, the transconductance of deflection system 45 is of one polarity with respect to anode 46 and results in the development of color difference signal B—Y across load resiston 53 coupled to output electrode 46;

B—Y is commonly referred to as a "positive-polarity" color difference signal. Consequently, if device 40 is arranged for balanced output, a corresponding signal but of opposite polarity appears across the load circuit comprising resistors 80, 81 and 83. This opposite-polarity color difference signal may be expressed as Y—B. Similarly, the signal appearing across resistors 84 and 83 corresponds to the second color difference signal R—Y but is of opposite polarity and may be designated Y—R. A portion of this signal also appears across resistors 80 and 81; however, in a practical system this is a negligible portion of the second opopsite-polarity color difference signal and may be disregarded as insignificant in the circuit operations. Accordingly, the total signal appearing across load resistor 83 may be made to represent the additive combination of fractional portions of each of the opposite-polarity color difference signals Y—R and Y—B, as compared to color difference signals R—Y and B—Y. The impedance values of resistors 80, 81, and 83 are selected so that these fractional portions have relative values correpsonding to those set forth in Equation 4; accordingly, the signal developed across resistor 83 represents a third color difference signal, G—Y, having the same effective polarity as those appearing across load resistors 53 and 73. As with the two other color difference signals, the signal G—Y developed at resistor 83 is utilized, in conjunction with the luminance signal applied to cathode 22, to control the intensity of one of the electron beams of image reproducer 20 (Figure 1).

Figure 2:
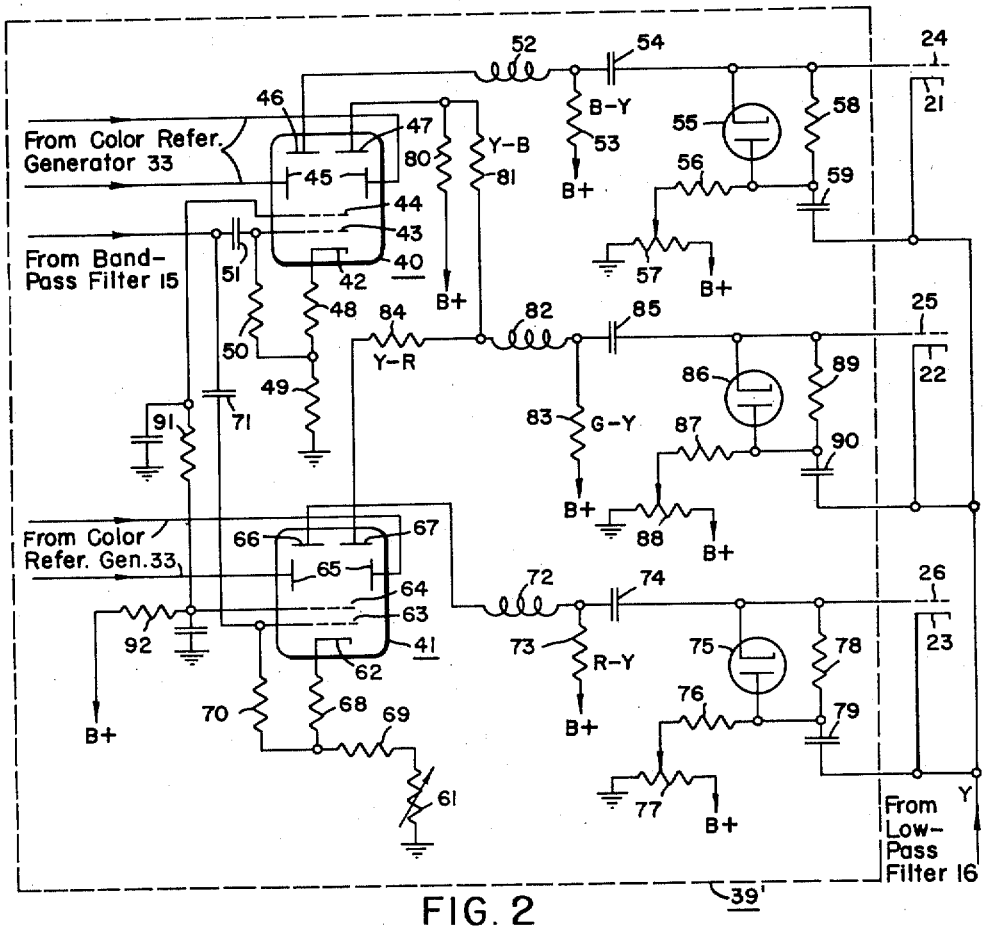
Figure 2 is a schematic diagram of a preferred embodiment of a color demodulating system constructed in accordance with the invention.

An examination of color demodulating system 39' of Figure 2 reveals that the demodulators employed are constructed and connected to provide inherently balanced outputs and that proper selection of the electrical parameters of the load circuits permits direct additive combination of two of the outputs of the demodulator tubes to form a third color difference signal not directly available in the conventional demodulating system 39 of Figure 1. Consequently, in system 39' there is no requirement for additional phase inverter circuits, and the matrix or combining circuit is considerably simplified. The direct-current levels of the various color difference signals and the luminance signal may be easily adjusted by regulating potentiometers 57, 77 and 88, whereas the relative signal levels of the two demodulators may be effectively controlled by variable resistor 61. It should be noted that the degenerative feedback from each of the demodulator cathodes and the associated first control electrode system, achieved through the use of unbypassed cathode resistors 49 and 69, 61, provides substantially complete linearity in operation.

A demodulating system has been constructed in accordance with the schematic diagram of Figure 2 and has been found to give very satisfactory performance; merely by way of illustration and in no sense by way of limitation, some of the circuit parameters for the demodulators as constructed are as follows:

| | |
|---|---|
| B+ | 370 volts. |
| Resistors **53** and **73** | 15,000 ohms each. |
| Resistors **48** and **68** | 240 ohms each. |
| Resistors **49** and **69** | 270 ohms each. |
| Resistors **50** and **70** | 100,000 ohms each. |
| Resistor **80** | 22,000 ohms. |
| Resistor **81** | 39,000 ohms. |
| Resistor **84** | 7,500 ohms. |
| Resistor **83** | 8,800 ohms. |

Figure 3:
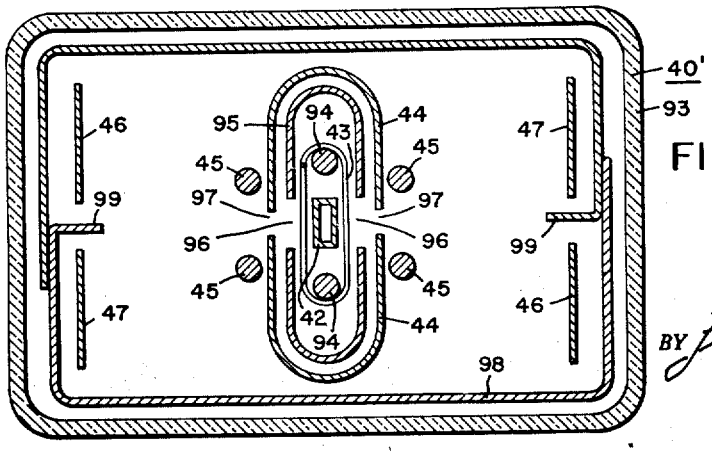
Figure 3 is a sectional view of an electron-discharge device incorporated in the system of Figure 2.

Figure 3 is a cross-sectional view of a deflection type electron-discharge device suitable for use in the demodulator of Figure 2. In Figure 3, the electron-discharge device 40' comprises an evacuated envelope 93 in which is mounted a centrally located cathode 42 having a pair of oppositely disposed electron-emissive surfaces. A control grid 43, comprising a closely wound helical coil mounted on a pair of support posts 94, surround cathode 43, and a focusing electrode 95 encloses both the cathode and the control electrode. Accelerating electrode 44 comprises a shield-like structure encompassing focusing electrode 95. Focusing electrode 95 is provided with a pair of apertures 96 on opposite sides of cathode 42 in alignment with a pair of corresponding apertures 97 in accelerating electrode 44. Deflection-control electrode system 45 comprises two pair of conductive electrodes, here shown as simple rods of circular cross-section, each pair being mounted adjacent one of the slots 97 on opposite sides of the tube axis along which the oppositely directed electron beams are projected. The double-sided structure further comprises two pair of output electrodes 46, 47, each pair of output electrodes being positioned to receive electrons from cathode 42 after passage through control electrode 43, with the distribution of electrons between the output electrodes of each pair determined by the instantaneous signal applied to deflection-control electrodes 45. A suppressor electrode 98 encompasses the entire electrode assembly, the suppressor including a pair of extensions 99 extending along the tube axis toward the cathode between the output electrodes of each pair.

The device shown in Figure 3 is of known construction and is merely illustrative of a suitable tube capable of meeting the operational requirements of devices 40 and 41 of Figure 2. The double-sided tube construction described is not in any way essential to the operation of the invention; however, it is desirable in that it furnishes greater beam current than a single-sided tube of the same general dimensions and thus permits coupling the demodulator directly to the image reproducer without requiring intervening amplification stages. By providing separate leads for the two deflection electrode systems of tube 40; it is possible to utilize the tube to perform the functions of both of the demodulator tubes of Figure 2 through independent operation of the two electrode systems; with an arrangement of this type, a somewhat longer electrode system may advantageously be employed to provide adequate beam current to achieve the required amplification.

Although the preferred embodiment illustrated in Figure 2 employs deflection-control demodulators, the invention is not dependent upon use of this particular type of tube. Many of the advantages of the invention may be realized through the use of somewhat more conventional space-charge-control discharge devices, as illustrated in the embodiment shown in Figure 4.

Figure 4:
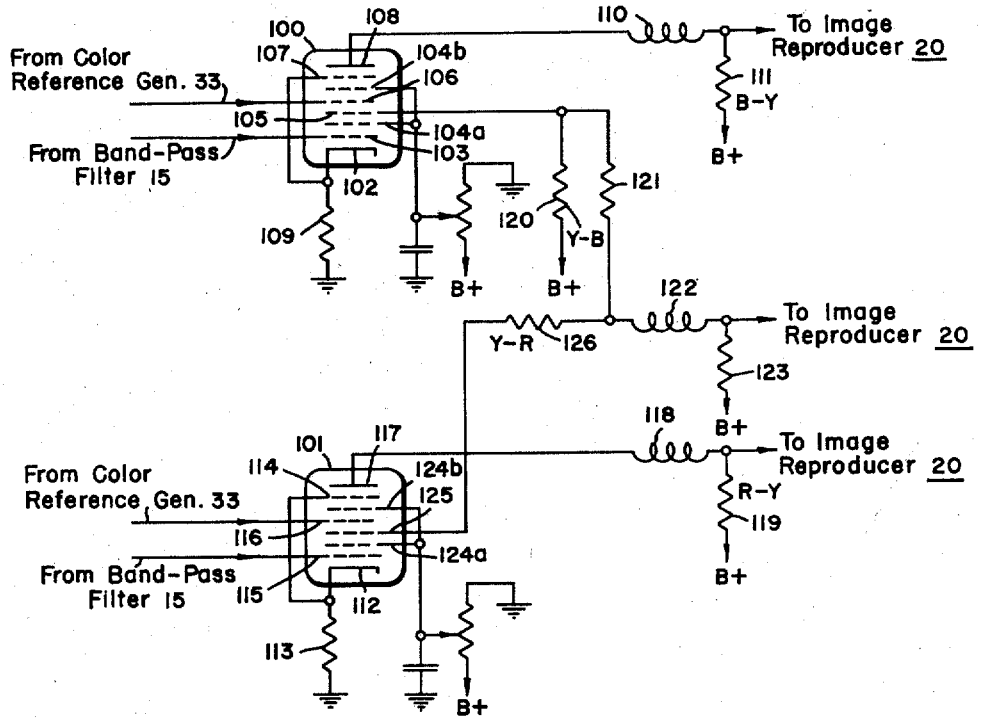
Figure 4 is a schematic diagram of another embodiment of the color demodulating system of the invention.

The demodulating system schematically illustrated in Figure 4 comprises a pair of electron-discharge devices 100 and 101, which are generally similar to the type commonly known as pentagrid converters. However, in tubes 100 and 101 an auxiliary anode is interposed between the first screen grid and the second control electrode so that the screen grid may be employed to accelerate the electron stream without materially influencing the total current and the auxiliary anode collects that portion of the electron stream rejected by the second control electrode. Tube 100 comprises, in order, a cathode 102, a first control electrode 103, a first screen electrode 104a, an auxiliary anode 105, a second control electrode 106, a second screen electrode 104b, a suppressor electrode 107, and an anode 108. Cathode 102 is connected to ground through a resistor 109, and suppressor 107 is directly connected to cathode 102. As in the embodiment illustrated in Figure 2, the first control electrode is coupled to a source of carrier color signal such as band-pass filter 15 (Figure 1), while second control electrode 106 is coupled to one of the two different-phase output circuits of a color reference generator corresponding to generator 33 of Figure 1. Anode 108 is coupled to an image reproducer, which may correspond to reproducer 20 of Figure 1, through a load circuit comprising a peaking coil 110 and a resistor 111, the resistor being coupled to a source of positive unidirectional operating potential B+. Demodulator tube 101 is essentially identical with tube 100 and includes a cathode 112 coupled to ground through a resistor 113 and a suppressor electrode 114 connected to cathode 112. The first control electrode 115 of tube 101 is coupled to band-pass filter 15, and the second control electrode 116 is coupled to the other output circuit of color reference generator 33. Anode 117 of tube 101 is coupled to operating potential source B+ through a peaking coil 118 and a load resistor 119 and is also coupled to image reproducer 20.

The two screen grids 104a, 104b of demodulator tube 100 are connected to each other and are connected to potential source B+ through a voltage divider and are bypassed to ground. Auxiliary anode 105 is coupled to source B+ through a resistor 120 and an additional parallel network connects anode 105 to B+ through a resistor 121, a peaking coil 122 and a load resistor 123. Load resistor 123 and coil 122 also couple the auxiliary anode 125 of second demodulator 101 to B+, an additional series resistor 126 being included in the circuit. Load resistor 123 is also coupled to image reproducer 20. The screen grid 124a and 124b of device 101 are connected together and are connected to source B+ through a voltage divider and bypassed to ground.

When the demodulating system of Figure 4 is placed in operation and operating potentials are applied to the various electrode systems of the two demodulator tubes, each of the tubes develops an electron stream directed from cathode to anode. In tube 100 the intensity of the electron stream is controlled by the carrier color signal applied to first control electrode 103, which is operated within the linear portion of its dynamic control characteristic. As the electron stream progresses through the tube, it approaches second control electrode 106 and, if the signal applied to electrode 106 is of appropriate polarity, continues to impinge upon anode 108 and energizes the load circuit comprising peaking coil 110 and load resistor 111. On the other hand, if the color reference signal applied to control electrode 106 at a given operating instant is of opposite polarity, the electron stream is reflected and is collected by auxiliary anode 105 and energizes the load circuit comprising resistors 120, 121 and 123 and coil 122. In other words, instantaneous space current increments of one polarity to anode 108 are accompanied by equivalent increments of opposite polarity to auxiliary anode 105, and control electrode 106 has a positive transconductance with respect to anode 108 and a negative transconductance with respect to anode 105. Control electrode 106 is overdriven to provide step function type operation fully analogous to that achieved through the use of deflection control in conjunction with adjacent output electrodes as in the embodiment of Figure 2. The same analysis may be applied to second demodulator tube 101, second control electrode 116 having a positive transconductance with respect to first output electrode 117 and a negative transconductance with respect to the second output electrode comprising auxiliary anode 125. Consequently, the demodulating system functions in a manner analogous to that of the system described in connection with Figure 2 and develops four separate outoutput signals. Proper selection of the operating potentials and phase characteristics of the applied signals results in the development of a first color difference signal B—Y across load resistor 111 and a second color difference signal R—Y across load resistor 119. Two opposite-polarity color difference signals Y—B and Y—R are developed in the output circuits connected to the auxiliary anodes of demodulator tubes 100 and 101 respectively and are additively combined in load resistor 123. The resistance values for the various load resistors are selected so that the combined signal appearing across load resistor 123 corresponds to the third normal polarity color difference signal G—Y, as determined by Equation 4. The color difference signals may be supplied directly to the image reproducer, as in the embodiment of Figure 2, or may be otherwise suitably utilized to control the reproduced image.

Figure 5:
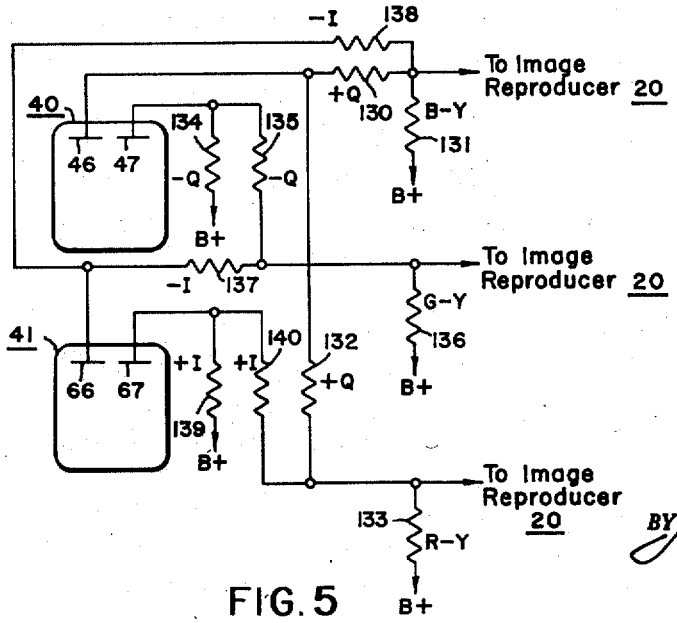
Figure 5 is a simplified schematic diagram of the demodulating system of the invention adapted for use with a modified transmission system.

The circuit illustrated in Figure 5 is a modification of the demodulating system of Figures 2 and 4 adapted for use in a color television system in which the color information is transmitted in the form of color difference signals based upon different primary colors from those used to analyze or synthesize the image. For this system, the color picture signal is of the form:

$$E=Y+K[Q \sin wt + I \cos wt] \quad (5)$$

which is essentially the same as Equation 1 except for the color difference signals employed. In Equation 5, Q represents a color difference signal formed at the transmitter by the additive combination of R—Y and B—Y in accordance with a predetermined ratio, whereas I is a color difference signal developed by combining R—Y and G—Y, again in accordance with a fixed ratio. The combining ratios for forming the two synthesized color difference signal I and Q are selected to that the same essential color information is transmitted but is effectively shifted with respect to the primary colors red, blue, and green.

The input circuits for demodulators 40 and 41 of the modified circuit of Figure 5 may be identical with those illustrated in Figure 2; accordingly, only the output electrodes comprising anodes 46 and 47 of tube 40 and anodes 66 and 67 of tube 41 are shown. Output electrode 46 is connected to a unidirectional potential source B+ through an output circuit comprising two parallel-connected networks; the first of these networks includes two series-connected resistors 130 and 131, whereas the second network comprises resistors 132 and 133 connected in series. Output electrode 47 is coupled to potential source B+ through an output circuit comprising a resistor 134 which is connected in parallel with two series-connected resistors 135 and 136. The output circuit for anode 66 of tube 41 is essentially similar to that coupled to output electrode 46 and includes a resistor 137 connected to unidirectional potential source B+ in series with resistor 136; the other branch of the output circuit for anode 66 comprises a resistor 138 connected in series with resistor 131. The output circuit for anode 67 is essentially similar to that for output electrode 47 and comprises a resistor 139 connected to B+ and a parallel network comprising resistor 140 connected in series with resistor 133.

When the modified demodulating circuit of Figure 5 is placed in operation, the signal developed by the output circuit connected to electrode 46 corresponds to color difference signal Q and has a predetermined polarity. This signal, conveniently referred to as the +Q color difference signal, appears across load resistors 131 and 133, and, in attenuated form, across load resistor 136. The signal developed by the output circuit coupled to anode 47, on the other hand, is essentially identical with that developed by the output circuit for electrode 46 but is of opposite polarities; this latter color difference signal, nominally referred to as the —Q signal, is developed across resistor 136, and, with considerably reduced amplitude, across resistors 131 and 133. Similarly, the output circuit connected to anode 66 of tube 41 develops a color difference signal corresponding to the synthesized signal I and of predetermined polarity; this latter signal, referred to as the —I color difference signal, appears across load resistors 131 and 136. The output circuit for anode 67 is employed to develop an opposite-polarity color difference signal, designated +I, which appears at load resistor 133. Of course, the —I signal is developed in atteunated form at resistor 133 and the +I signal appears with reduced amplitude across resistors 131 and 136. Consequently, the total signal appearing across load resistor 131 effectively represents a combination of the +Q and —I color difference signals; the ratio of the applied signals is determined by the impedance values of the resistors employed in the output circuits so that the total signal across resistor 131 corresponds to color difference signal B—Y. Similarly, the signal appearing across load resistor 136 represents the additive combination of the —Q and —I color difference signals in predetermined ratio and corresponds to color difference signal G—Y, whereas the signal appearing across load resistor 133 is a combination of the +Q and +I signals and represents color difference signal R—Y. The modified circuit of Figure 5 thus provides four separate color difference signal outputs which are additively combined in predetermined combinations and ratios to develop three other color difference signals. The output circuits and combining means are all simple bidirectional impedance networks, preferably resistance networks.

The embodiments of the invention illustrated in Figures 2, 4, and 5 each provide for four individual output signals, namely, two color difference signals of predetermined polarity and two corresponding color difference signals of opposite polarity. In the first two systems illustrated, two of these output signals are directly applied to the image reproducer and two are additively combined to develop a third color difference signal of the same predetermined polarity which is also impressed upon the reproducer. In the modified circuit of Figure 5, the four output signals are combined in predetermined proportions to develop additional color difference signals of common polarity, referred to a different set of primary colors, by the use of simple linear bidirectional impedance networks. The signals developed by the demodulating systems of the invention provide improved balance in the color content of the reproduced image and do not require additional amplification prior to utilization in the reproducer, although further amplification may be utilized if desired. A substantial economy in constructing the demodulating system is achieved by the elimination of auxiliary phase inverters and amplifiers.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. A demodulating system for a color television receiver including means responsive to a received color television signal for developing a carrier color signal and a color reference signal, said demodulating system comprising: a first electron-discharged device including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; a second electron-discharge device including means comprising a cathode for projecting an electron stream, an output electrode, and first and second control electrode systems intermediate said cathode and said output electrode; means for concurrently impressing said carrier color signal on one of said control electrode systems of said first device and on one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said output electrode of said second device for developing a second color difference signal of said predetermined polarity; and a third output circuit coupled to said other output electrode of said first device for developing an opposite-polarity first color difference signal.

2. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and on one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device for developing a second color difference signal of said predetermined polarity; a third output circuit coupled to said other output electrode of said first device for developing an opposite-polarity first color difference signal; a fourth output circuit coupled to said other output electrode of said second device for developing an opposite-polarity second color difference signal; and means for combining said opposite-polarity first and second color difference signals to develop a third color difference signal of said predetermined polarity.

3. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, an intensity-control electrode system intermediate said cathode and said output electrodes, and a deflection-control electrode system having a transconductance of one polarity with respect to one of said output electrodes and a transconductance of opposite polarity with respect to the other of said output electrodes; means for concurrently impressing said carrier color signal on each of said intensity-control electrode systems of said electron-discharge devices; means for concurrently impressing said color reference signal in predetermined phase on said deflection-control electrode system of said first device and in predetermined different phase on said deflection-control electrode system of said second device; a first output circuit coupled to said one output electrode of said first device for developing a first color difference signal of predetermined polarity; a second output circuit coupled to said out output electrode of said second device for developing a second color difference signal of said predetermined polarity; a third output circuit coupled to said other output electrode of said first device for developing an opposite-polarity first color difference signal; a fourth output circuit coupled to said other output electrode of said second device for developing an opposite-polarity second color difference signal; and means for combining said opposite-polarity first and second color difference signals to develop a third color difference signal of said predetermined polarity.

4. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and on one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device for developing a second color difference signal of said predetermined polarity; a third output circuit coupled to said other output electrode of said first device for developing an opposite-polarity first color difference signal; a fourth output circuit coupled to said other output electrode of said second device for developing an opposite polarity second color difference signal; and a network for combining predetermined fractional portions of said opposite-polarity first and second color difference signals in accordance with a predetermined fixed ratio to develop a third color difference signal of said predetermined polarity.

5. A demodulating system for a color television receiver including means responsive to a received color television signal for developing a carrier color signal and a color reference signal, said demodulating system comprising: first and second electron-discharge devices each including means comprising a cathode for projecting an electron stream, a pair of balanced output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and one one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device for developing a second color difference signal of said predetermined polarity; and an additional output circuit, coupled to said other output electrode of said first device and to said other output electrode of said second device, for developing a third color difference signal of said predetermined polarity.

6. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and on one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device fo developing a second color difference signal of said predetermined polarity; a third output circuit coupled to said other output electrode of said first device for developing an opposite-polarity first color difference signal; a fourth output circuit coupled to said other output electrode of said second device for developing an opposite-polarity second color difference signal; and at least one bidirectional impedance network for additively combining two of said color difference signals to develop another color difference signal.

7. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and on one of said control electrode systems of said second device; means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device for developing a second color difference signal of said predetermined polarity; a third output circuit coupled to said other output electrode of said first device for developing an opposite-polarity first color difference signal; a fourth output circuit coupled to said other output electrode of said second device for developing an opposite-polarity second color difference signal; and a load impedance common to two of said output circuits for combining two of said color difference signals to develop another color difference signal.

8. A demodulating system for a color television receiver including means responsive to a received color television signal for developing a carrier color signal and a color reference signal, said demodulating system comprising: first and second electron-discharge devices each including means comprising a cathode for projecting an electron stream, a pair of output electrodes, a first control electrode system intermediate said cathode and said output electrodes, and a second control electrode system having a transconductance of one polarity with respect to one of said output electrodes and a transconductance of opposite polarity with respect to the other of said output electrodes; means for concurrently impressing said carrier color signal on one of said control electrode systems of said first device and on one of said control electrode systems of said second device;

means for concurrently impressing said color reference signal in predetermined phase on the other of said control electrode systems of said first device and in predetermined different phase on the other of said control electrode systems of said second device; a first output circuit coupled to said one output electrode of said first device for developing a first color difference signal of predetermined polarity; a second output circuit coupled to said one output electrode of said second device for developing a second color difference signal of said predetermined polarity; a third output circuit coupled to said other output electrode of said first device for developing an opposite-polarity first color difference signal; a fourth output circuit coupled to said other output electrode of said second device for developing an opposite-polarity second color difference signal; a first load impedance, common to said first and second output circuits, for combining said first and second color difference signals to develop a third color difference signal; a second load impedance, common to said third and fourth output circuits, for combining said first and second opposite-polarity color difference signals to develop a fourth color difference signal of the same polarity as said third color difference signal; and a third load impedance, common to said first and fourth output circuits, for combining said first color difference signal and said second opposite-polarity color difference signal to develop a fifth color difference signal of the same polarity as said third and fourth color difference signals.

9. A demodulating system for a color television receiver including means responsive to a received color television signal for developing a carrier color signal and a color reference signal, said demodulating system comprising: first and second electron-discharge devices each including first electrode means, comprising a pair of output electrodes, for establishing a space discharge and second electrode means comprising a control electrode system having a transconductance of one polarity with respect to one of said output electrodes and a transconductance of opposite-polarity with respect to the other of said output electrodes; means for concurrently impressing said carrier color signal upon one of said electrode means of said first device and upon the corresponding electrode means of said second device; means for concurrently impressing said color reference signal in predetermined phase upon said control electrode system of said first device and in predetermined different phase upon said control electrode system of said second device; a first output circuit coupled to said one output electrode of said first device for developing a first color difference signal of predetermined polarity; a second output circuit coupled to said one output electrode of said second device for developing a second color difference signal of said predetermined polarity; and a third output circuit coupled to said other output electrode of said first device for developing an opposite-polarity first color difference signal.

10. A demodulating system for a color television receiver including means responsive to a received color television signal for developing a carrier color signal and a color reference signal, said demodulating system comprising: first and second electron-discharge devices each including first electrode means, comprising a pair of output electrodes, for establishing a space discharge and second electrode means comprising a control electrode system having a transconductance of one polarity with respect to one of said output electrodes and a transconductance of opposite-polarity with respect to the other of said output electrodes; means for concurrently impressing said carrier color signal upon one of said electrode means of said first device and upon the corresponding electrode means of said second device; means for concurrently impressing said color reference signal in predetermined phase upon said control electrode system of said first device and in predetermined different phase upon said control electrode system of said second device; a first output circuit coupled to said one output electrode of said first device for developing a first color difference signal of predetermined polarity; a second output circuit coupled to said one output electrode of said second device for developing a second color difference signal of said predetermined polarity; and an additional output circuit, coupled to said other output electrode of said first device and to said other output electrode of said second device, for developing a third color difference signal of said predetermined polarity.

*11. A demodulating system for a color television receiver including means responsive to a received color television wave for developing a carrier color signal and a color reference signal, said demodulating system comprising: first and second electron discharge devices each including a first electrode system, comprising a pair of output electrodes, for establishing space discharge current and a second electrode system, comprising control electrode means, for controlling said space discharge current; means, including one of said electrode systems of each of said devices, responsive to one of said signals for increasing current to one of said output electrodes while decreasing current to the other of said output electrodes in each of said devices; means for impressing the other of said signals on the other of said electrode systems of each of said devices; means, including a first output circuit coupled to an output electrode of said first device, for developing a first color difference signal of a predetermined polarity; means, including a second output circuit coupled to an output electrode of said second device, for developing a second color difference signal of said predetermined polarity; and means, including an additional output circuit coupled to the remaining output electrode of said first device and to the remaining output electrode of said second device, for developing a third color difference signal of said predetermined polarity.*

*12. A demodulating system for a color television receiver including means responsive to a received color television wave for developing a carrier color signal and a color reference signal, said demodulating system comprising: a first electron discharge device including a first electrode system, comprising a pair of output electrodes, for establishing a space discharge current and a second electrode system, comprising control electrode means, for controlling said space discharge current; means, including one of said electrode systems, responsive to a predetermined phase of one of said signals for increasing current to one of said output electrodes while decreasing current to the other of said output electrodes; means for impressing the other of said signals on the other of said electrode systems; a second electron discharge device including a third electrode system, comprising a pair of output electrodes, for establishing a space discharge current and a fourth electrode system, comprising control electrode means, for controlling said space discharge current; means, including one of said third and fourth electrode systems, responsive to a predetermined different phase of one of said signals for increasing current to one of said output electrodes while decreasing current to the other of said output electrodes of said second device; means for impressing said other of said signals on the other of said third and fourth electrode systems; means, including a first output circuit coupled to one output electrode of said first device, for developing a first color difference signal of a predetermined polarity; means, including a second output circuit coupled to one output electrode of said second device, for developing a second color difference signal of said predetermined polarity; and means, including an additional output circuit coupled to the remaining output electrode of said first device and to the remaining output electrode of said second device, for developing a third color difference signal of said predetermined polarity.*

*13. A demodulating system for a color television receiver including means responsive to a received color tele-*

*vision wave for developing a carrier color signal and a color reference signal, said demodulating system comprising: a first electron discharge device including a first electrode system, comprising a pair of output electrodes, for establishing a space discharge current and a second electrode system, comprising control electrode means, for controlling said space discharge current; means, including said electrode systems, responsive concurrently to a predetermined phase of one of said signals and to the other of said signals for developing a first color difference signal of one polarity on one of said output electrodes and of the opposite polarity on the other of said output electrodes; a second electron discharge device including a third electrode system, comprising a pair of output electrodes, for establishing a space discharge current and a fourth electrode system, comprising control electrode means, for controlling said space discharge current; means, including said third and fourth electrode systems, responsive concurrently to a predetermined different phase of said one signal and to said other signal for developing a second color difference signal of one polarity on one of said output electrodes and of the opposite polarity on the other of said output electrodes of said second device; and means coupled to said other output electrode of each of said devices for developing a third color difference signal.*

*14. A demodulating system for a color television receiver including means responsive to a received color television wave for developing a carrier color signal and a color reference signal, said demodulating system comprising: a first electron discharge device including a first electrode system, comprising a pair of output electrodes, for establishing a space discharge current and a second electrode system, comprising control electrode means, for controlling said space discharge current; means, including said electrode systems, responsive concurrently to a predetermined phase of said color reference signal and to said carrier color signal for developing a first color difference signal of one polarity on one of said output electrodes and of the opposite polarity on the other of said output electrodes; a second electron discharge device including a third electrode system, comprising a pair of output electrodes, for establishing a space discharge current and a fourth electrode system, comprising control electrode means, for controlling said space discharge current; means, including said third and fourth electrode systems, responsive to a predetermined different phase of said color reference signal and to said carrier color signal for developing a second color difference signal of one polarity on one of said output electrodes and of the opposite polarity on the other of said output electrodes of said second device; and means coupled to said other output electrode of each of said devices for developing a third color difference signal.*

References Cited in the file of this patent or the original patent

UNITED STATES PATENTS

| | | |
|---|---|---|
| 2,163,939 | Dillenburger | June 27, 1939 |
| 2,718,546 | Schlesinger | Sept. 20, 1955 |